March 6, 1973 J. DREXLER 3,719,801
ASSOCIATIVE SELECTION AND CORRELATION APPARATUS
Filed Feb. 10, 1971
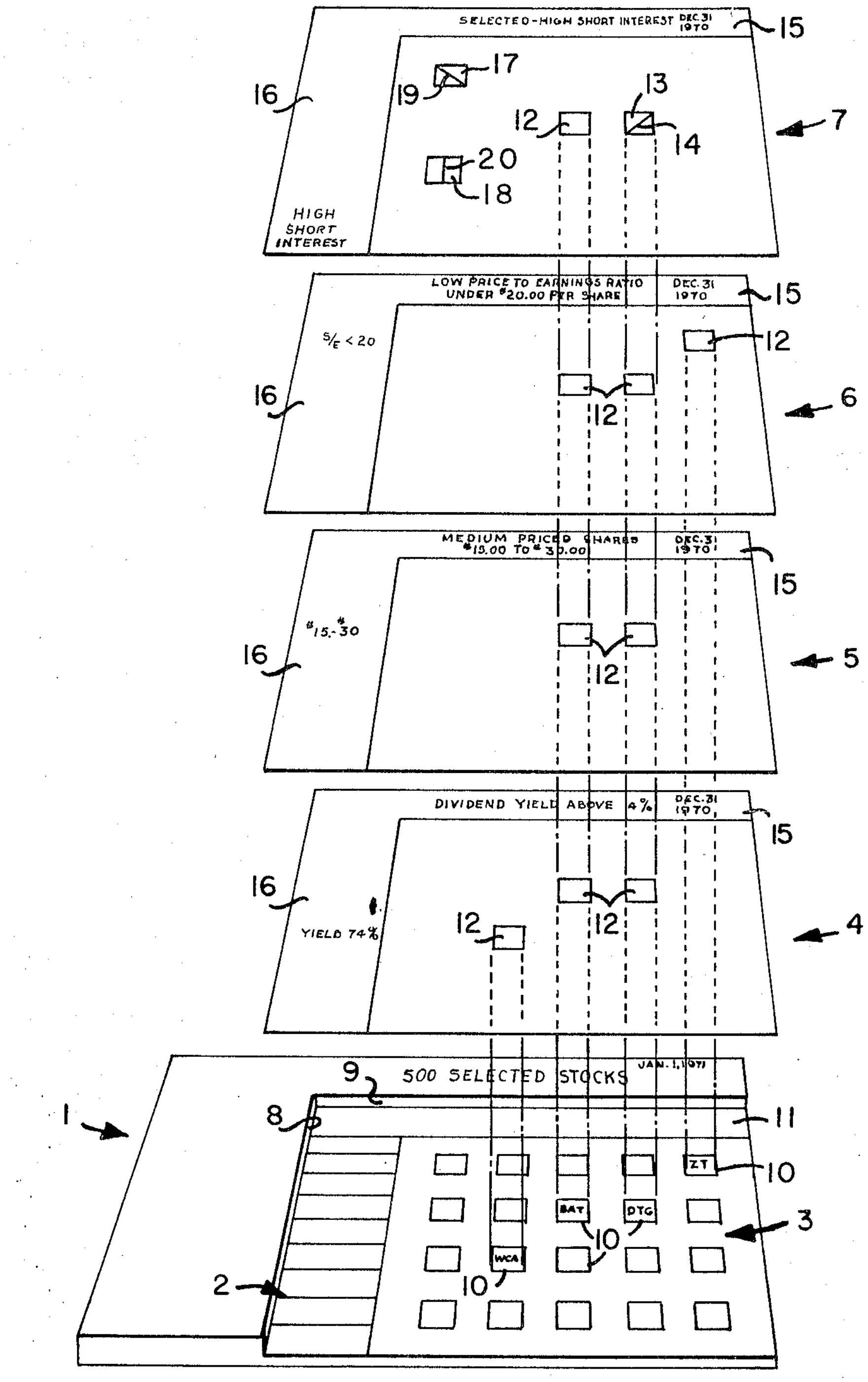
INVENTOR.
JEROME DREXLER
BY Warren M Becker
J. Rosenblum
ATTORNEYS 3,719,801

ASSOCIATIVE SELECTION AND CORRELATION APPARATUS

Jerome Drexler, Los Altos Hills, Calif., assignor to Drexler Technology Corporation, Palo Alto, Calif.

Filed Feb. 10, 1971, Ser. No. 116,711
Int. Cl. G06k *21/04;* G09b *23/28*
U.S. Cl. 235—61.12 N 2 Claims

ABSTRACT OF THE DISCLOSURE

Associative selection apparatus comprising a thin plastic card containing a plurality of symbols representative of selected items is provided for use with one or more thin plastic overlays, called quality cards. Each quality card contains information respecting a predetermined quality or characteristic of the items listed on the item card. The quality cards are removably held in registration with the item card in a frame. Each quality card contains its information in the form of transparent windows and opaque areas provided to be in registration with the symbols of the items on the item card. The transparent windows and opaque areas permit and prevent respectively visual identication of those items qualifying and failing to qualify with respect to the criterion contained on the quality card. Certain of the quality cards contain information respecting some but not all the items listed on the item card. In those instances, the transparent windows of the quality card are provided with a thin diagonal line, coloration or other similar partial obscuration in registration with the item which was not considered with respect to such information in order that such items qualifying with respect to other quality cards, may be readily identified. The quality cards may further be used in pairs apart from the item card for determining the correlation between two qualities for all the items or a sampling of such items.

BACKGROUND OF THE INVENTION

The present invention relates in general to apparatus and methods used in associatively selecting and analyzing items, such as securities, the relationship between temperature and humidity, and the like according to one or more selected criteria or qualities. Conventionally, the analysis, of selected securities, according to selected criteria, for example, is published in books and magazines. For any particular published analysis to be useful as well as meaningful, the number of securities and criterion simultaneously considered must be necessarily limited. The same is true with respect to the analysis of other items, such as employees with respect to their qualifications.

In a known prior art apparatus used in correlating information for assisting in the selection of employees in accordance with one or more predetermined qualifications there is provided a plurality of quality cards within which there are provided a plurality of pin holes at selected coordinates. In making the quality cards, corresponding coordinates on each of the quality cards are assigned to an individual employee. If an employee qualifies with respect to a specific quality say, French speaking, a pin hole is punched in the "French" quality card at the assigned coordinate. If the employee does not speak French, the card is not punched. As described, the prior art apparatus is truly binary in nature for no provision is made in the making of the quality cards for a consideration of items which are not considered or fail to qualify in some way with respect to a specified quality. Thus, if information is not available with respect to whether or not an employee speaks French, for example, there is no means provided by which this fact may be represented. As a practical matter, if not of necessity, such employee would be omitted from consideration.

To improve the usefulness of the system, provision is made to combine the quality cards with one or more perforated colored transparencies.

In practice, with the prior art device, when it is desired to identify an item having one or more qualities, a beam of light is projected on one or more of the cards and the coordinates of the pin holes through which the beam passes are determined. A book or catalog is then consulted to further identify the item assigned to the coordinates determined with the beam of light.

Of course, a much more sophisticated and extensive analysis may be made using many criterion, but this is known to require the use of complicated procedures and often expensive data processing equipment which is impractical and unavailable to the average businessman or investor.

It is therefore, highly desirable to have a readily available, economical apparatus and method for performing the more sophisticated and extensive analysis of securities or other items than has been heretofor possible with no more additional equipment required, if any, than pencil and paper.

SUMMARY OF THE PRESENT INVENTION

In accordance with the present invention there is provided an item card imprinted with symbols representing a plurality of selected items. In an illustrated embodiment, the items are securities and the item card is a security card. The security card is provided to be used with one or more overlays for visually selecting securities having selected criteria. In use, the security card and overlays are held in registration in a frame. In registration with the symbols, i.e. ticker symbols, certain of the overlays, or quality cards, contain transparent windows and opaque areas, depending on whether or not respectively, a security whose symbol is in registration therewith meets the criteria of the particular quality card. Other quality cards, which may be called special quality cards, contain criterion with respect to some but not all of the securities listed on the security card. With respect to the special quality cards, those securities failing to meet the criteria of the special quality card are not identifiable by reason of the opaque areas while those securities not considered or failing in some predetermined way with respect to such criteria are visible but identified as such by a thin diagonal line or other obscuration in the transparent window in registration with the ticker symbol. A margin along an edge of each quality card is provided for containing quality card identification information in staggered relationship with respect to the identification information on other quality cards such that when two or more quality cards are used simultaneously, ready identification of all criteria being considered is possible.

In addition, the quality cards may be used in pairs apart from the item card for quickly and easily determining correlations between two qualities.

These and other objects, features and advantages of the present invention will be apparent from the detailed description and accompanying drawing.

DESCRIPTION OF THE DRAWING

The drawing is an exploded view of a security card, overlays and frame made in accordance with the present invention.

DETAILED DESCRIPTION

As shown in the drawing, there is provided a frame 1 comprising a recess 2, adapted to receive and removably retain an item or security card 3 and one or more overlays 4–7 called quality cards. Recess 2 in frame 1 is formed by a pair of walls 8, 9 which extend about and are abutted by the mutually perpendicular edges of security card 3 and overlays 4–7 for maintaining overlays 4–7 in registration with security card 3. Frame 1 is preferably molded or otherwise made from translucent plastic material for providing an inexpensive, stiff, easily cleaned receptacle for security card 3 and overlays 4–7.

Security card 3 comprises a thin transparent plastic card on which is imprinted a plurality of ticker symbols 10 representing a plurality of selected securities. Ticker symbols 10 are preferably arranged in alphabetical order. While only a few ticker symbols are illustrated for clarity, a commercial embodiment of the invention is proposed with 600 ticker symbols. Preferably, the only criterion respecting the total number of securities listed on card 3, is that the ticker symbols 10 should be readable without the aid of magnification equipment and the size of frame 1 should be suitable for hand-held operation.

Security card 3 is further provided with a margin 11 along its upper edge and a margin 12 along its left edge. Margin 11 is provided to contain identification information pertaining to security card 3, such as for example, its effective date. Margin 11 is provided for accommodating the identification information appearing in a corresponding margin in each of overlays 4–7 as more fully detailed hereinafter.

Each of overlays 4–7 are thin plastic cards comprising an array of plurality of transparent windows and opaque areas in registration with the ticker symbols 10 on security card 3. As previously noted, overlays 4–7 are conveniently called quality cards. In making an overlay, each of the securities represented on security card 3 is analyzed with respect to a selected criterion quality or characteristic. If a security qualifies, the area of the quality card in registration with the ticker symbol representing that security on security card 3 is provided to be transparent whereby the ticker symbol will be visible when the quality card overlays the security card.

Referring to quality cards 4–7, the unobscrued areas 12, illustrated as small rectangles, are transparent windows. Thus, when any one of quality cards 4–7 overlays security card 3, the ticker symbol in registration therewith is visible indicating that the particular security qualifies with respect to the criterion used in making that quality card. It is apparent that if two or more quality cards overlay securiy card 3 simultaneously, fewer securities will be found qualifying thereby limiting the number of securities meeting all of the qualifications represented by all of the quality cards used.

Occasionally, a selected quality or characteristic of a particular quality card will be applicable to some but not all of the securities listed on security card 3. This may be because not all the securities listed were analyzed with respect to that particular quality or characteristic or a particular quality or characteristic was not applicable to some of the listed securities.

In either event, it is not desirable to wholly obscure the ticker symbols of the securities not considered in making the latter quality cards, as such securities may qualify as to all other quality cards used and should therefor be identifiable. Accordingly, there is provided a modified quality card.

Referring to special quality card 7, there is provided in an otherwise transparent window 13, a thin diagonal line 14. Line 14 is such as to leave the ticker symbol in registration herewith visible and identifiable thereby indicating to the analyst that the particular security neither qualified nor is disqualified, but rather was not considered or failed in some way with respect to the quality used in the preparation of the special quality card.

Alternatively, special quality card 7 may have two or more transparent windows, 17, 18 with two or more different kinds of partial obscurations, such as lines 19, 20 running at various angles to line 14 of window 13. The registration of a window 17 of one card with a window 18 of another, wherein both are in registration with a particular security might well indicate that the security in registration therewith falls within or without a predetermined range of qualities. In any event, it is apparent that in accordance with the present invention an immense amount of information is readily and simply presented to the user by the simple expedient of varying or modifying the type or types of partial obscuration used in the otherwise transparent windows of the special quality cards.

Each of quality cards 4–7 are further provided with a margin 15 along their respective upper edges and a margin 16 along their respective left edges in registration with margins 11, 12 of security card 3. Margin 15 is provided to contain identification information identifying, for example, the effective date of a particular criterion used in preparing the quality card. Margin 16 is provided to contain abbreviated identification information. The identification information in margin 16 is selectively located on different lines during the preparation of each of the quality cards such that the identification information on each of the quality cards in use is visible and readable when two or more quality cards are used simultaneously. The margin 12 in security card 3 is illustrated as lined to show the positional relationship of the identification information in margin 16 of each of the quality cards with respect to one another. In practice, margin 12 need not be lines.

In a commercial embodiment, the depth of recess 2 of security card 3 is such as to permit the simultaneous use of as many as 14 overlays. The size of security card 3 and overlays 4–7 is such as to permit the use of lettering of sufficient size for adequate readability. In lieu of using diagonal line 14 in area 13 of special quality card 7 as described, area 13 may be colored to impart the same information.

It is apparent from the foregoing that when quality card 4 is placed in registration with security card 3, securities BAT, DTC and WCA will be visible through transparent windows 12 indicating that these securities have a dividend yield above 4%. When quality card 5 is overlayed quality card 4, securities BAT and DTC are found to further qualify with respect to falling within a price range of $15 to $30 per share while WCA is found not to be visible and therefore does not have both of these qualities.

If, in lieu of using quality cards 4, 5, quality cards 6, 7 are overlayed security card 3, it is found that each of securities AZT, BAT and DTC have a low price to earnings ratio of under 20. BAT, however, is the only security which qualifies with respect to a security having both a high short interest as well as a low price to earnings ratio. DTC, it is noted, by virtue of the diagonal line 14, was not considered with respect to high short interest. DTC, however, is identifiable as qualifying with respect to a low price to earnings ratio. AZT on the other hand was considered with respect to high short interest but as indicated failed to qualify with respect thereto.

While the present invention has been described with regard to a device for analyzing a plurality of securities with respect to one or more predetermined qualities, it is understood that it is not intended to be limited thereto, but has equal applicability for use in analyzing and visually identifying directly a variety of items with respect to a variety of qualities or characteristics. For example, the items may be employees. The qualities may be, male, 40 years of age or older, French speaking and an engineer. By overlaying the cards containing the exemplary quality information, the identity of the indivduals having all of these qualities is readily and visually determinable. If one or more of the employees listed on the item card were not considered with respect to a specific quality, the area on that particular quality card in registration with the employee's position on the item card would be a transparent window with a partial obscuration.

Apart from use with item card 1, pairs of quality cards can be used separately to determine for example the correlation between two qualities for all items on item card 1 or a sampling of such items. An example will be given of how this is done and how conclusions can be derived is described with respect to a security analysis using four quality cards labelled as follows:

| Quality | Designation | No. of transparent windows |
|---|---|---|
| Latest quarterly earnings up | "A" | 234 out of 583. |
| Price under book value | "B" | 121 out of 583. |
| Primary trend upward | "C" | 64 out of 583. |
| Low price securities under $15 | "D" | 120 out of 583. |

The number of transparent windows is simply the number of securities having the specified quality out of a possible 583 securities. The specific identity of the security is not required and therefore security card 1 is not used in making correlations. If no correlation exisits between a given pair of quality cards, the transparent windows of each would be ramdomly distributed and the number of transparent windows of both in registration is predictable. In actual practice the number of transparencies in registration is different from that predicted as shown in the following:

| | Prediction of transparencies in registration if no correlation | Actual number of transparencies in registration | Calculated correlation (to nearest integer), percent |
|---|---|---|---|
| AB | 48.6 | 19 | −62 |
| AC | 25.7 | 46 | +53 |
| AD | 48.2 | 21 | −56 |
| BC | 13.3 | 2 | −85 |
| BD | 25 | 64 | +41 |
| CD | 13.2 | 0 | −100 |

The predictable condition of no correlation is arrived at by obtaining the product of the fractional product of the ratio of the number of actual transparencies to the number of possible transparencies for each card and the number of possible transparencies of both in registration thus, using BD, $$\frac{121}{583}\times\frac{120}{583}\times 583\approx 25$$

In practice as indicated, however, there is usually either a positive correlation or a negative correlation depending on whether the number of transparencies in registration is greater than or less than, respectively, the number predicted for a condition of no correlation. If a positive correlation exists, it is:

$$\text{Percent positive correlation} = +\frac{\text{Actual}-\text{Predicted}}{\text{Smaller number of transparencies of the individual cards}-\text{predicted numbers}}\times 100$$

Thus, for AC:

$$\text{Percent positive correlation}=\frac{+46-25.7}{64-25.7}\times 100=+53\%$$

If a negative correlation exists, it is:

$$\text{Percent negative correlation}=-\frac{\text{Predicted-Actual}}{\text{Predicted}}\times 100$$

Thus, for BC $$\text{Percent negative correlation}=-\frac{13.3-2}{13.3}\times 100=-85\%$$

To understand the meaning of the correlations, attention is directed to the positive correlation obtained with the pair AC. AC is +53%. This means that of the group of securities having a quarterly earnings higher than last year, an above average number will have a primary trend upward and vice versa. In fact, 46 out of 64, or 72%, of those showing a primary trend upward have their quarterly earnings on the rise while only 28% have their earnings falling. To reiterate, if the 234 transparent windows in card A and the 64 windows in card C were located at random, then 25 to 26 windows would be in registration in the combination AC. Actually 46 windows were in registration of 53% above the no-correlation point. If 64 windows had been in registration, then the correlation would have been 100%. That is, we could say that all securities whose primary trend is upward have increased earnings this quarter.

Looking at the strong negative correlation BC. It is found that if one considers all securities whose primary trend is upward from last year, that it is highly unlikely that any are selling under book value. In fact only 2 out of 64 securities were below book value of 3.1%. By the definition of correlation given, the correlation was −85%.

From the foregoing, it is apparent that for a given group of securities (or any items which can be categorized with respect to qualities) that predictions of group behavior in one quality may be predicted on a probability basis from group behavior in another quality. For example, in a bear market with only 64 out of 853 securities having a primary trend upward, it is possible to determine with the present invention that 72% of those with this latter quality are "earnings-up companies."

In another example, the calculated correlation for the combination CD illustrates that there were no low priced securities with a primary trend upward. This could mean that either low priced securities were out of vogue during the period or that the securities were above $15 at the start of the period and fell below $15 one year later thus accounting for this high negative correlation. Actually over 40% of the under $15 securities were under $15 at the start of the period, which gives strong support to the "out of vogue" theory and points up the value of the correlation.

While providing a simple and expedient means and method for determining complex correlations between various qualities of securities, the overlays of the present invention are equally suitable for use in making correlations between other and well known qualities, such as, the correlation between temperature and humidity using, say, 500 sample measurements taken at 500 locations.

Referring first to temperature, a temperature quality card is made in which all samples with an above average temperature are represented by a transparent window and all samples with a below average temperature are represented by an opaque area. Since an average temperature is used in making the quality card, 250 transparent windows and 250 opaque areas will be presented on the temperature quality card. Similarly, the humidity quality card will have 250 transparent windows representing those sample measurements having an above average humidity and 250 opaque areas representing those samples having a below average humidity. It is understood that the transparent windows or opaque areas for each of the sample measurements on both cards are in registration.

As described above with respect to correlating qualities of securities, in the absence of a correlation between temperature and humidity, the number of transparent windows which would be in registration when the temperature and humidity cards are held in registration would be 125 or 25% of the total number of sample measurements taken. If there is a positive correlation between temperature and humidity, the number of transparent windows in registration would be greater than 125. If there is actually a negative correlation, the number of transparent windows in registration will be less than 125. The percent of positive and negative correlation, if it is desired, may be determined in similar fashion to that used in analyzing securities using the above described formulas.

From the foregoing, it is apparent that the item and quality cards and methods of using them described herein provide a means for quickly, easily and economically presenting vast quantities of information concerning a great number of items and a simple and expedient way in which to analyze and correlate the information concerning them. The special quality cards comprising windows with various partial obscurations are particularly notable in that the information imparted by them is not restricted to a binary level of intelligence but immediately extends the information imparted to a ternay level and beyond by combinations of partial obscuration. That is to say, with a partial obscuration or combinations of partial obscurations it is possible to consider not only whether a given item qualifies or fails to qualify with respect to a specified quality but to determine as well for example, the degree of compliance or lack of compliance therewith, within a predetermined range.

What is claimed is:

1. An associative selection apparatus for visually selecting by means of one or more quality cards those items having one or more predetermined qualities out of a group of items having plural qualities, comprising:

an item card containing indicia arranged in a predetermined order for identifying each item in said group of items, first and second quality cards each having a transparent margin, a transparent window and an opaque area, wherein said transparent window is located in a position corresponding to the location on said item card of an item having a first predetermined quality, adapted to overlay and to be held in registration with said item card for permitting through said transparent window visual identification of said item having said first and second predetermined qualities, quality identification in the transparent margin of each of said first and second quality cards at a different margin location on each card whereby quality identification of each card is visible when said first quality card overlays said second quality card.

2. An associative selection apparatus for visually selecting by means of one or more quality cards those items having one or more predetermined qualities out of a group of items having plural qualities, comprising:

an item card containing indicia arranged in predetermined order for identifying each item in said group of items, a plurality of quality cards each having a transparent window, a first partially transparent window, a transparent margin, and an opaque area, wherein said transparent window is located in a position corresponding to the location on said item card of an item having a first predetermined quality, and said first partially transparent window is located in a position corresponding to the location on said item card of an item having a second predetermined quality, and wherein said quality cards are adapted to overlay and to be held in registration with said item card for permitting through said transparent window and said first partially transparent window visual identification of those items having said first quality and visual identification of those items having said second quality, respectively, quality identification in the transparent margin of each of said plurality of quality cards at a different margin location on each card whereby quality identification of each card is visible when said quality cards overlay each other.

References Cited

UNITED STATES PATENTS

| | | | |
|---|---|---|---|
| 3,328,563 | 6/1967 | Kollar | 35—17 |
| 3,186,111 | 6/1965 | Lawlor | 35—17 |
| 1,988,634 | 1/1935 | Stonecypher | 35—12 |
| 1,526,717 | 2/1925 | Nunez | 35—17 |
| 3,171,021 | 2/1965 | Jonker | 235—61.12 N |
| 2,953,300 | 9/1960 | O'Brian | 235—61.12 R |
| 3,471,684 | 10/1969 | Berezov | 235—61.11 E |
| 3,215,848 | 11/1965 | Zworykin | 250—219 D |

MAYNARD R. WILBUR, Primary Examiner

R. M. KILGORE, Assistant Examiner

U.S. Cl. X.R.

35—17; 235—61.12 R; 250—219 D